United States Patent
Humphries et al.

(10) Patent No.: US 11,861,635 B1
(45) Date of Patent: Jan. 2, 2024

(54) AUTOMATIC ANALYSIS OF REGIONAL HOUSING MARKETS BASED ON THE APPRECIATION OR DEPRECIATION OF INDIVIDUAL HOMES

(71) Applicant: MFTB Holdco, Inc., Seattle, WA (US)

(72) Inventors: Stanley B. Humphries, Sammamish, WA (US); Peter Gross, Seattle, WA (US); Svenja Gudell, Seattle, WA (US); Krishna Rao, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 137 days.

(21) Appl. No.: 16/423,873

(22) Filed: May 28, 2019

Related U.S. Application Data (60) Provisional application No. 62/821,159, filed on Mar. 20, 2019.

(51) Int. Cl.
   *G06Q 30/02* (2023.01)
   *G06Q 50/16* (2012.01)
   *G06Q 30/0204* (2023.01)
   *G06Q 30/0283* (2023.01)

(52) U.S. Cl.
   CPC ..... *G06Q 30/0205* (2013.01); *G06Q 30/0283* (2013.01); *G06Q 50/16* (2013.01)

(58) Field of Classification Search
   None
   See application file for complete search history.

(56) References Cited

U.S. PATENT DOCUMENTS

| | | | |
|---|---|---|---|
| 6,493,721 B1 | 12/2002 | Getchius et al. | |
| 6,915,206 B2 | 7/2005 | Sasajima | |
| 7,783,562 B1 | 8/2010 | Ellis | |
| 8,001,024 B2 | 8/2011 | Graboske et al. | |
| 8,032,401 B2 | 10/2011 | Choubey | |
| 8,140,421 B1 * | 3/2012 | Humphries | G06Q 40/025 705/36 R |

(Continued)

OTHER PUBLICATIONS

Kiel, Katherine A., and Jeffrey E. Zabel. "Evaluating the usefulness of the American housing survey for creating house price indices." The Journal of Real Estate Finance and Economics 14.1 (1997): 189-202.*

(Continued)

*Primary Examiner* — Peter Ludwig
*Assistant Examiner* — Donald J Edmonds
(74) *Attorney, Agent, or Firm* — Perkins Coie LLP (57) ABSTRACT

A facility for determining a housing index value for a subject geographic region for a subject period in time is described. For each home in a set of homes within the subject geographic region, the facility determines home attribute values; applies a first valuation model and second valuation for the subject geographic region to the home attributes to obtain estimated values of the home at the beginning and end of the subject period, respectively; and determines an appreciation rate for the home on the basis of the estimated values of the home at the beginning and end of the subject period. The facility combines the appreciation rates to obtain an aggregate appreciation rate for the subject period, and combines the aggregate appreciation rate for the period with a housing index value for a prior period to obtain the housing index value for the subject geographic region and subject period.

23 Claims, 5 Drawing Sheets

(56) References Cited

U.S. PATENT DOCUMENTS

| | | | |
|---|---|---|---|
| 8,180,697 | B2 | 5/2012 | Frischer |
| 8,190,516 | B2 | 5/2012 | Ghosh et al. |
| 8,676,680 | B2 | 3/2014 | Humphries et al. |
| 10,055,788 | B1* | 8/2018 | Tatang .................. G06Q 40/06 |
| 10,198,735 | B1 | 2/2019 | Humphries et al. |
| 2003/0055747 | A1 | 3/2003 | Carr et al. |
| 2003/0078878 | A1 | 4/2003 | Opsahi-Ong |
| 2004/0267657 | A1 | 12/2004 | Hecht |
| 2005/0288942 | A1 | 12/2005 | Graboske et al. |
| 2005/0288957 | A1 | 12/2005 | Eraker |
| 2006/0015357 | A1* | 1/2006 | Cagan ................. G06Q 30/0278 705/306 |
| 2006/0080114 | A1 | 4/2006 | Bakes et al. |
| 2006/0089842 | A1 | 4/2006 | Medawar |
| 2007/0124235 | A1 | 5/2007 | Chakraborty et al. |
| 2007/0185727 | A1* | 8/2007 | Ma ..................... G06Q 30/0278 705/306 |
| 2007/0185906 | A1* | 8/2007 | Humphries ............ G06Q 50/16 |
| 2007/0198278 | A1* | 8/2007 | Cheng ................... G06Q 40/00 705/306 |
| 2007/0244780 | A1 | 10/2007 | Liu |
| 2008/0189198 | A1* | 8/2008 | Winans .................. G06Q 40/00 705/35 |
| 2008/0301064 | A1 | 12/2008 | Burns |
| 2008/0312942 | A1 | 12/2008 | Katta et al. |
| 2009/0132316 | A1 | 5/2009 | Florance et al. |
| 2009/0287596 | A1 | 11/2009 | Torrenegra |
| 2010/0161498 | A1* | 6/2010 | Walker .................. G06Q 30/02 705/306 |
| 2011/0047083 | A1 | 2/2011 | Lawler |
| 2011/0218934 | A1 | 9/2011 | Elser |
| 2011/0218937 | A1 | 9/2011 | Elser |
| 2012/0005111 | A2 | 1/2012 | Lowenstein et al. |
| 2012/0066022 | A1* | 3/2012 | Kagarlis ............ G06Q 30/0201 705/7.29 |
| 2012/0078770 | A1 | 3/2012 | Hecht |
| 2013/0041841 | A1 | 2/2013 | Lyons |
| 2013/0103457 | A1* | 4/2013 | Marshall ............ G06Q 30/0278 705/7.34 |
| 2013/0144683 | A1* | 6/2013 | Rappaport ............ G06Q 30/02 705/7.29 |
| 2014/0164260 | A1* | 6/2014 | Spieckerman ..... G06Q 30/0278 705/306 |
| 2014/0343970 | A1* | 11/2014 | Weber .................... G06Q 40/08 705/4 |
| 2014/0372173 | A1* | 12/2014 | Koganti ............ G06Q 30/0202 705/7.31 |
| 2015/0242747 | A1* | 8/2015 | Packes .................. G06Q 50/16 706/17 |
| 2016/0292800 | A1* | 10/2016 | Smith .................... G06Q 50/16 |
| 2017/0091627 | A1* | 3/2017 | Terrazas ................. G06N 20/00 |
| 2018/0232824 | A1 | 8/2018 | Kang |
| 2018/0293676 | A1* | 10/2018 | Xie ....................... G06F 16/901 |
| 2019/0318433 | A1 | 10/2019 | McGee |

OTHER PUBLICATIONS

Non-Final Office Acton for U.S. Appl. No. 16/235,009, dated Jan. 24, 2020, 18 pages.
U.S. Appl. No. 13/044,480 for Humphries et al., filed Mar. 9, 2011.
U.S. Appl. No. 16/235,009 for Humphries, filed Dec. 28, 2018.
"The Comprehensive R Archive Network,", www.cran.r-project.org, http://web.archive.org/web/20050830073913/cran.r-project.org/banner.shtml, [internet archive date: Aug. 30, 2005], pp. 1-2.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Final Office Action for U.S. Appl. No. 11/347,000, dated Jan. 3, 2012, 17 pages.
Final Office Action for U.S. Appl. No. 13/044,480, dated Feb. 19, 2014, 31 pages.
Final Office Action for U.S. Appl. No. 13/044,480, dated Jun. 12, 17, 55 pages.
Final Office Action for U.S. Appl. No. 13/044,480, dated Jul. 10, 2015, 35 pages.
Final Office Action for U.S. Appl. No. 13/044,480, dated Dec. 14, 2018, 35 pages.
Final Office Action for U.S. Appl. No. 13/044,490, dated Mar. 14, 2013, 35 pages.
Final Office Action for U.S. Appl. No. 13/044,490, dated Mar. 29, 2017, 7 pages.
Final Office Action for U.S. Appl. No. 13/044,490, dated May 7, 2015, 36 pages.
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
Melville, J., "How much should I charge to rent my house?", published Dec. 5, 2010, retrieved from http://homeguides.sfgate.com/much-should-charge-rent-house-8314.html on Aug. 11, 2016, 2 pages.
Meyer, Robert T., "The Learning of Multiattribute Judgment Policies," The Journal of Consumer Research, vol. 14, No. 2, Sep. 1987, 20 pages.
Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 13/044,480, dated Mar. 12, 2015, 32 pages.
Non-Final Office Action for U.S. Appl. No. 13/044,480, dated May 2, 2018, 51 pages.
Non-Final Office Action for U.S. Appl. No. 13/044,480, dated Jul. 17, 2014, 31 pages.
Non-Final Office Action for U.S. Appl. No. 13/044,480, dated Oct. 24, 2013, 29 pages.
Non-Final Office Action for U.S. Appl. No. 13/044,490, dated Dec. 17, 2014, 30 pages.
Non-Final Office Action for U.S. Appl. No. 13/044,490, dated Jan. 14, 2016, 18 pages.
Non-Final Office Action for U.S. Appl. No. 13/044,490, dated Jan. 24, 2018, 8 pages.
Non-Final Office Action for U.S. Appl. No. 13/044,490, dated Oct. 11, 2012, 30 pages.
Notice of Allowance for U.S. Appl. No. 11/347,000, dated Oct. 24, 2013, 12 pages.
Notice of Allowance for U.S. Appl. No. 13/044,480, dated Jun. 26, 2019, 17 pages.
Notice of Allowance for U.S. Appl. No. 13/044,490, dated May 22, 2018, 8 pages.
Notice of Allowance for U.S. Appl. No. 13/044,490, dated Dec. 5, 2018, 6 pages.
One-month Office Action for U.S. Appl. No. 11/347,000, dated Jul. 26, 2013, 6 pages.
Quirk, B., "Zilpy.com launches a rental data website built in partnership with Zillow!!! ", published Jan. 29, 2008, retrieved from http://www.propertymanagementmavens.com/archives/2008/1 on Aug. 11, 2016, 3 pages.
U.S. Appl. No. 16/665,426 for Humphries et al., filed Oct. 28, 2019.
Dialog NPL (Non-Patent Literatures) Search Report, dated Sep. 21, 2021 (Year: 2021).
Farooqui, Y. "Machine Learning with Python Scikit-Learn," https://www.yusrafarooqui.com/project-portfolio/macine-learning-with-scikit-learn-an-overview, Feb. 23, 2019, 43 pages.
Final Office Action for U.S. Appl. No. 16/125,318, dated Aug. 25, 2020, 25 pages.

(56) References Cited

OTHER PUBLICATIONS

Final Office Action for U.S. Appl. No. 16/235,009, dated Jul. 13, 2020; 21 pages.
Google Scholar Article NPL Search Report, Sep. 21, 2021 (Year: 2021).
Google Scholar Case Law NPL Search Report, Sep. 21, 2021 (Year: 2021).
Hassan, M.A. "Predicting Housing Prices Using Structural Attributes and Distance to Nearby Schools." Aug. 11, 2018, 17 pages.
Non-Final Office Action for U.S. Appl. No. 16/125,318, dated Mar. 13, 2020, 20 pages.
Non-Final Office Action for U.S. Appl. No. 16/125,318, dated Apr. 29, 2021, 25 pages.
Non-Final Office Action for U.S. Appl. No. 16/235,009, dated Dec. 4, 2020, 9 pages.
Non-Final Office Action for U.S. Appl. No. 16/457,390, dated May 27, 2021, 26 pages.
Notice of Allowance for U.S. Appl. No. 16/125,318, dated Sep. 29, 2021, 12 pages.
Notice of Allowance for U.S. Appl. No. 16/235,009, dated Mar. 24, 2021, 7 pages.
U.S. Appl. No. 17/354,827 for Humphries et al., filed Jun. 22, 2021.

\* cited by examiner

| Home — 301 | April 2019 Valuation — 302 | May 2019 Valuation — 303 | Appreciation — 304 | |
|---|---|---|---|---|
| 11 E. Elm | $202,000 | $204,700 | 1.34% | — 311 |
| 1521 Angeles Dr. | — | $346,000 | | — 312 |
| 210 Stone Way | $414,500 | $413,200 | -0.31% | — 313 |
| 44 Lake St. | $213,700 | $215,300 | 7.49% | — 314 |
| 1229 Main | $955,000 | $918,500 | -3.82% | — 315 |
| 2443 Lincoln | $310,000 | $314,000 | 1.29% | — 316 |
| 97 Cherry | $61,000 | $69,000 | 13.11% | — 317 |
| 2222 Smith St. | $250,000 | $208,700 | -16.52% | — 318 |
| 990 River Rd. | $310,000 | $396,400 | 27.87% | — 319 |
| 101 Broad St. | $265,000 | $263,800 | -0.45% | — 320 |
| 46 Lake St. | $270,500 | $273,200 | 1.00% | — 321 |

*FIG. 6*

AUTOMATIC ANALYSIS OF REGIONAL HOUSING MARKETS BASED ON THE APPRECIATION OR DEPRECIATION OF INDIVIDUAL HOMES

CROSS-REFERENCE TO RELATED APPLICATION(S)

This application claims the benefit of U.S. Provisional Patent Application No. 62/821,159, filed on Mar. 20, 2019, which is hereby incorporated by reference in its entirety. In cases where the present patent application conflicts with an application incorporated herein by reference, the present application controls.

BACKGROUND

The state of regional markets for homes is sometimes tracked using indices determined based on either home prices or home valuations.

In one approach to determining a single-sale home price index, all of the home sales occurring in the subject region during a subject time period are collected, and their selling prices averaged. The average selling price in the region for the period can be compared to average selling prices for different periods in the same region, or for different regions during the same period.

In one approach to determining a repeat-sale home price index, all of the homes in a subject region that were sold twice during a subject period are collected, and for each such home, an appreciation rate is determined by subtracting the selling price of the earlier sale from the selling price of the later sale, then dividing by the intervening amount of time. The appreciation rates determined for all of the homes in the region are averaged. The average appreciation rate for the region for the period can be compared to average appreciation rates for different periods in the same region, or for different regions during the same period.

In one approach to determining a home valuation index, a statistical model is used to automatically predict the value of as many of the homes in the subject region as possible for the subject time period, and these predicted values are averaged. The average estimated value in the region for the period can be compared to average estimated values for different periods in the same region, or for different regions during the same period.

DETAILED DESCRIPTION

The inventors have recognized a variety of disadvantages of the conventional approaches to valuing regional housing markets discussed above. For example, both of the conventional home price indices discussed above require a home to be sold during the index's subject period in order to be included in the index—twice during the subject period for the repeat-sale home price index. This limits the sample size on which the index is based, resulting in a high level of statistical uncertainty. Worse, the particular homes that qualify for inclusion in the index on the basis of their sale are frequently affected by selection bias—that is, these homes may be disproportionately those that are high-valued or low-valued, fast-appreciating, slow-appreciating, slow-depreciating, or fast-appreciating, such that the resulting index fails to accurately reflect the housing market in the region as a whole.

With respect to the conventional home valuation index discussed above, the inventors have recognized that, between the two periods, homes in the subject region can enter or leave the set of homes upon which the index is based, which can bias the index. For example, if homes valued above the region's average leave the set without leaving the housing market (such as being removed from property tax records, having their home attribute values no longer available, etc.), the value of the index will decline in a way that is not reflective of the actual value of the housing market.

In response to recognizing disadvantages of conventional approaches to valuing regional housing markets including those discussed above, the inventors have conceived and reduced to practice a software and/or hardware facility for automatically analyzing a regional housing market based on the appreciation or depreciation of individual homes therein ("the facility").

In some embodiments, the facility determines a regional housing value index based on identifying all of the homes whose values can be estimated by a model at both the beginning and end of a period across which the index is measured, such as a month. The facility determines the change in estimated value of each identified, adjusting the home's attributes upon which the valuations are based to be the same at both the beginning and end of the period, and estimating beginning and ending valuations using the same model design. A mean of appreciation across the identified homes is determined, weighted by the estimated beginning values of each home, and this is multiplicatively added or chained to the index level determined for the previous period.

In various embodiments, the facility uses the index values it produces to, for example, compare the values of two or more different housing markets; track the value of a single housing market over a period of time; approximate the price appreciation of individual homes or arbitrary sets of homes between any two periods; forecast future housing prices and other housing and non-housing time series; create absolute valuation indicators for markets in combination with other data, such as price-to-rent or price-to-income ratios; create relative valuation indicators both with respect to a region or set of homes over time or between regions or sets of homes at a given point in time; create measurements of appreciation in different market segments, such as price tiers, BA/BR counts, square footage counts, home type, building age, etc.; build risk models for home price portfolios, such as those that systematic buyers and sellers of homes would hold; etc.

By performing in some or all of the ways described above, the facility provides a characterization of the value and rate of appreciation of a regional housing market that is more accurate than existing housing indices.

Figure 1:
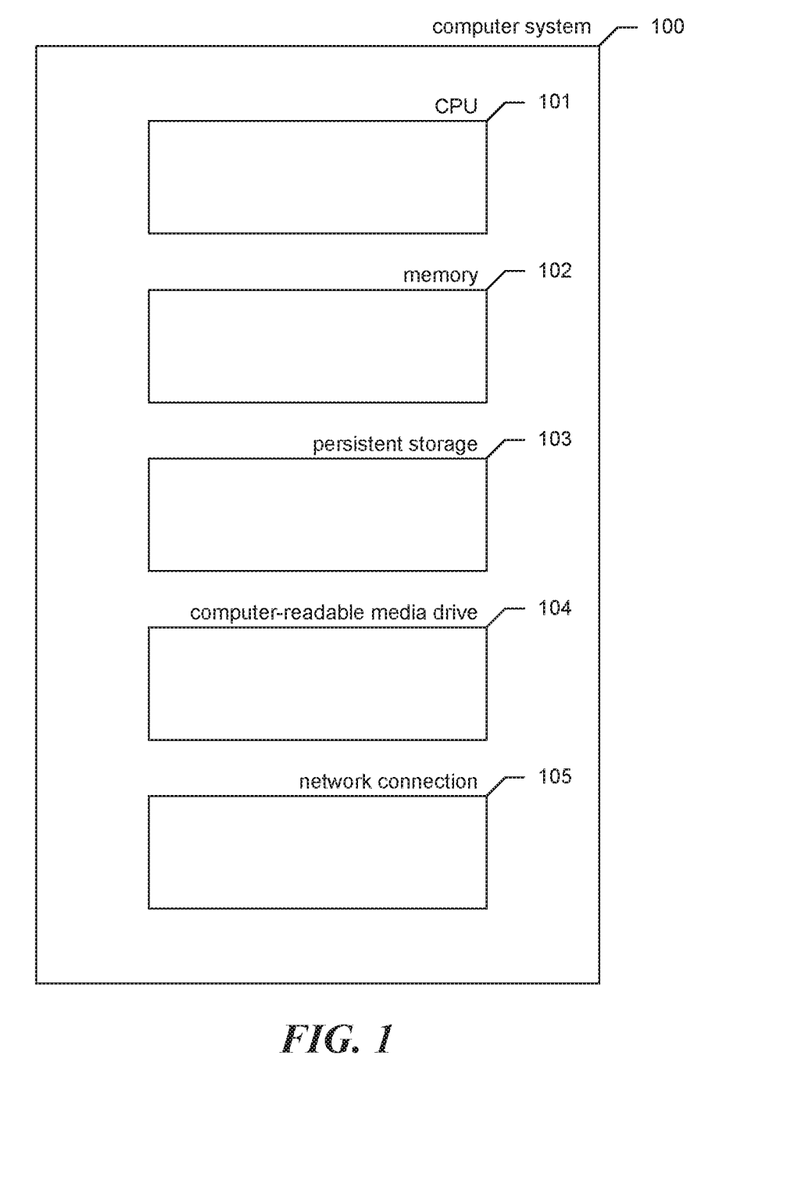
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices can include server computer systems, desktop computer systems, laptop computer systems, netbooks, mobile phones, personal digital assistants, televisions, cameras, automobile computers, electronic media players, etc. In various embodiments, the computer systems and devices 100 include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. In some embodiments, computing resources provided by one or more cloud computing services are used to support the operation of the facility. While computer systems configured as described above are typically used to support the operation of the facility, those skilled in the art will appreciate that the facility may be implemented using devices of various types and configurations, and having various components.

Figure 2:
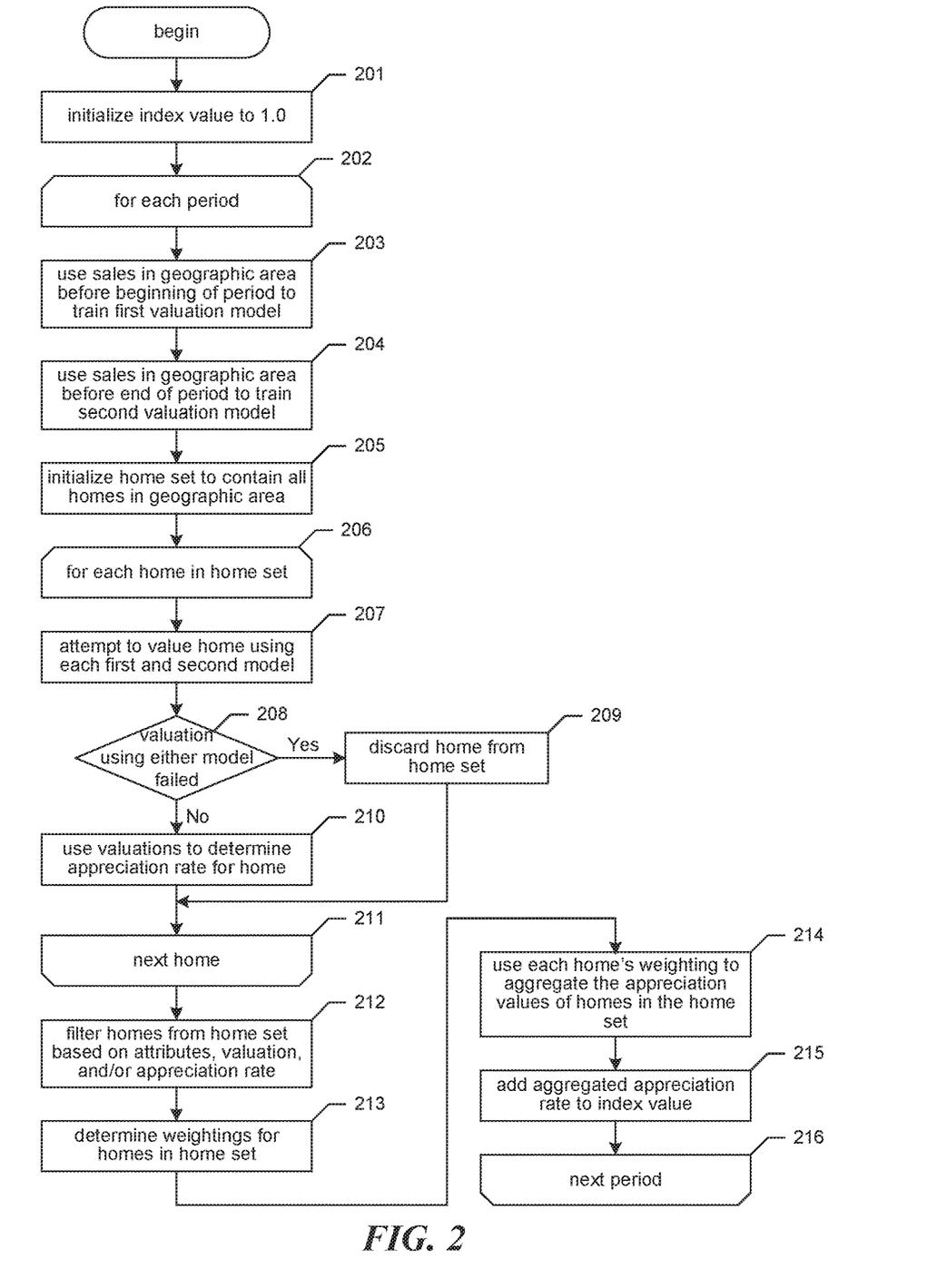
FIG. 2 is a flow diagram showing a process performed by the facility in some embodiments to maintain an index value for a subject geographic region.

FIG. 2 is a flow diagram showing a process performed by the facility in some embodiments to maintain an index value for a subject geographic region. In various embodiments, the region is of various relative sizes and natures, such as, for example, census tract, zip code, subdivision, neighborhood, borough, city, county, groups of states, state, province, country, or continent, or any custom region described by a set of properties explicitly or a list of conditions on properties within a region (such as 1 BRs, >1000 sqft. homes). In act 201, the facility initializes a value for the index to an initial value, such as 1.0. In acts 202-216, the facility loops through each period of time for which the facility determines a value of the index. In various embodiments, these periods are of various lengths, such as, for example, a century, a decade, a year, a quarter, a month, a pair of weeks, a single week, a day, or an hour. In act 203, the facility uses sales in the subject geographic area that occurred before the beginning of the current period to train a first home valuation model for the geographic region. The following applications, each of which is hereby incorporated by reference in its entirety, describe aspects of constructing, applying valuation models, adjusting models (e.g. adjusting parameters such as weights and/or biases so as to minimize some error measure over data) that are employed by the facility in various embodiments: U.S. patent application Ser. No. 11/347,000 filed on Feb. 3, 2006 (now U.S. Pat. No. 8,676, 680); U.S. patent application Ser. No. 11/347,024 filed on Feb. 3, 2006 (now U.S. Pat. No. 7,970,674); U.S. patent application Ser. No. 11/524,048 filed on Sep. 19, 2006 (now U.S. Pat. No. 8,515,839); U.S. patent application Ser. No. 11/971,758 filed on Jan. 9, 2008 (now U.S. Pat. No. 8,140, 421); U.S. patent application Ser. No. 13/044,480 filed on Mar. 9, 2011; U.S. Provisional Patent Application No. 61/706,241 filed on Sep. 27, 2012; U.S. patent application Ser. No. 15/715,098 filed on Sep. 25, 2017; U.S. Provisional Patent Application No. 61/761,153 filed on Feb. 5, 2013; U.S. patent application Ser. No. 14/640,860 filed on Mar. 6, 2015; U.S. Provisional Patent Application No. 61/939,268 filed on Feb. 13, 2014; U.S. patent application Ser. No. 15/439,388 filed on Feb. 22, 2017; U.S. patent application Ser. No. 11/525,114 filed on Sep. 20, 2006; U.S. patent application Ser. No. 12/924,037 filed on Sep. 16, 2010; U.S. patent application Ser. No. 13/245,584 filed on Sep. 26, 2011 (now U.S. Pat. No. 10,078,679); and U.S. patent application Ser. No. 16/178,457 filed on Nov. 1, 2018. In act 204, the facility uses sales in the geographic area before the end of the current period to train a second valuation model. In some embodiments, the facility uses the same model design for the first and second valuation models. In various embodiments, the sameness of the design of these two models extends to such factors as model type, model implementation, model configuration, model parameters, and/or model resolution.

In act 205, the facility initializes a home set to contain all of the homes in the subject geographic area, or substantially all of these homes, such as 99.9% of them, 99.5% of them, 99% of them, 98% of them, 97% of them, 96% of them, 95% of them, or 90% of them, for example. In acts 206-211, the facility loops through each home in the home set that was initialized in act 205. In act 207, the facility attempts to value the current home using each of the first model trained in act 203 and the second model trained in act 204. In some embodiments, in act 207, the facility provides the same set of home attribute values for the current home to both of the valuation models. In some such embodiments, the facility provides home attribute values for the subject home believed to be accurate at the beginning of the period; in some such embodiments, the facility provides home attribute values for the subject home believed to be accurate at the end of the period.

In act 208, if valuation of the home using either model failed, then the facility continues in act 209, else the facility continues in act 210. In act 209, the facility discards (removes) the home from the home set. After act 209, the facility continues in act 211. In some embodiments (not shown), where valuation of the home using either model fails, rather than discarding the home from the set, the facility imputes a starting and/or ending value for the home through another mechanism. In various embodiments, the facility performs such imputation using, for example: simpler "fall-back" models that depend on fewer input variables/features than the full valuation model to allow training and scoring even when some data feeds are down; econometric, statistical, machine learning, or AI models that forecast valuations for homes based on each home's home valuation estimation history and other available features; heuristic procedures, such as taking the average or median home valuation estimate for homes that have home valuation estimates available in a given period and are comparable on some set of dimensions (such as BR/BA count, square footage, etc.) to the home that has no home valuation estimate in that period; etc.

In act 210, the facility uses the valuations determined in act 207 to determine an appreciation rate for the home. In some embodiments, the facility determines the appreciation rate for the home by subtracting the valuation produced by the first model from the valuation produced by the second model, and dividing by the length of each period, or by the valuation produced by the first model. In act 211, if additional homes remain to be processed, then the facility continues in act 206 to process the next home, else the facility continues in act 212.

Figure 3:
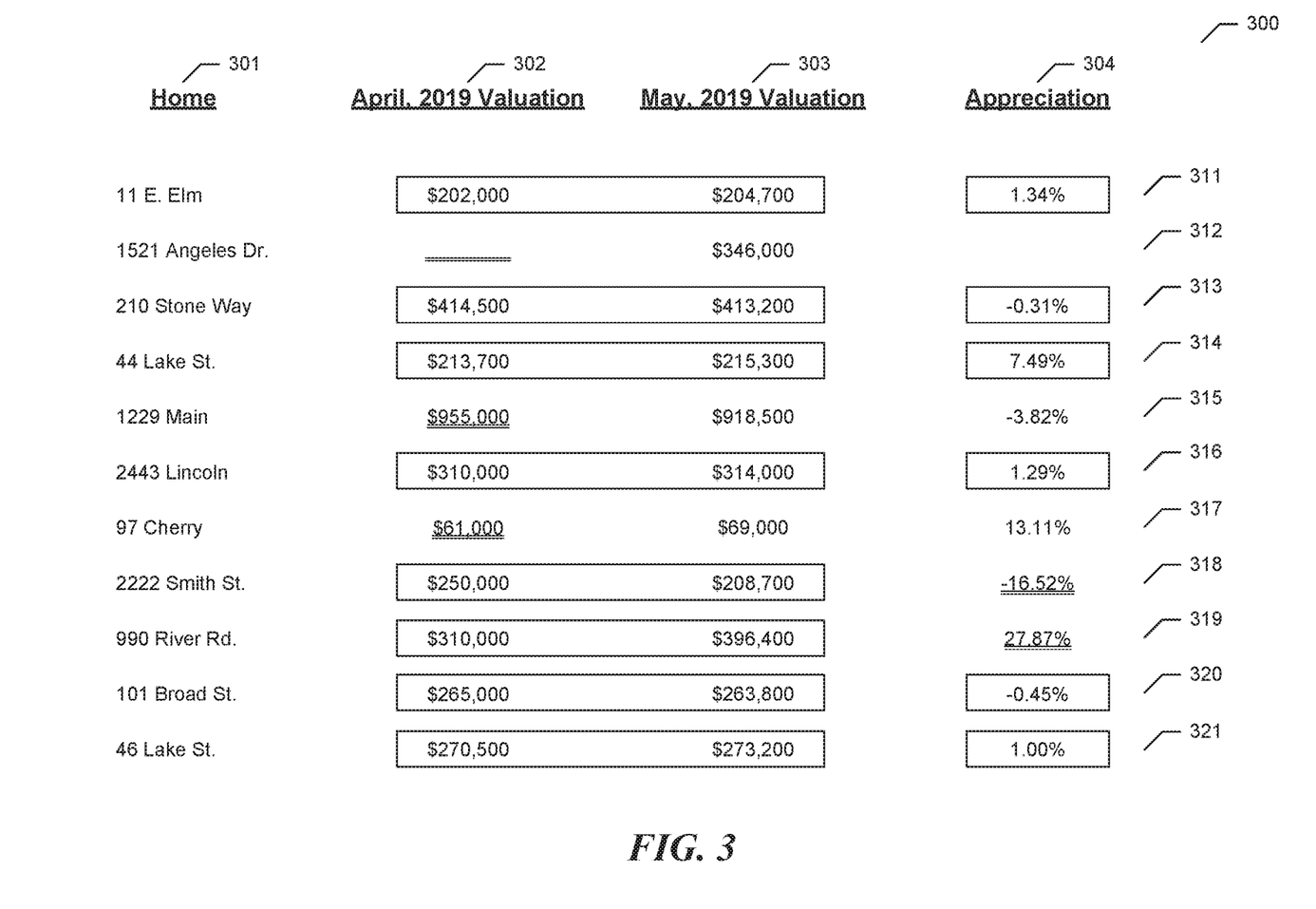
FIG. 3 is a table diagram showing a sample state generated and used by the facility in determining a value of the index for a particular geographic region and period.

FIG. 3 is a table diagram showing a sample state generated and used by the facility in determining a value of the index for a particular geographic region and period. The table 300 is comprised of a number of rows, including rows 311-321, each corresponding to a home in the subject geographic region. Each row is divided into the following columns: a home column 301 identifying the home, such as by its address, tax I.D. number, facility-assigned unique identifier, etc.; a first valuation column 302 showing a valuation produced for the home by the first model, for the time that is at the beginning of the current period; a second valuation column 303 showing a valuation for the home produced by the second model for the time that is at the end of the current period; and an appreciation column 304 showing an appreciation rate for the home across the period. For example, row 311 indicates that the home at 11 East Elm had a valuation in April, 2019 of $202,000, a valuation in May, 2019 of $204,700, and an appreciation rate of 1.34%. When the home set is initialized, it contains all of the homes to which rows 311-321 correspond. However, based upon determining that the home to which row 312 corresponds cannot be valued by the first model at the beginning of the current period, the facility discards the home to which row 312 corresponds from the home set, as indicated by the double underlining at the intersection of row 312 and column 302.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Returning to FIG. 2, in act 212, the facility filters homes from the home set based upon thresholds or other patterns against their attributes, valuations, and/or appreciation rates. For example, in some embodiments, the facility filters homes from the home set that have less than 200 square feet of floor space, or greater than 8,000 square feet of floor space; those whose valuation and/or tax assessment is in the top or bottom 5% of those in the geographic area; and those whose appreciation rate is in the top or bottom 5% of those in the geographic region.

FIG. 3 shows the filtering performed by the facility in some of these categories. For example, the double underlining in FIG. 3 shows that the home corresponding to row 317 is filtered from the home set on the basis of having a valuation in the lower 5% for the subject geographic area; the home to which row 315 corresponds is filtered from the home set on the basis of having a valuation in the upper 5% for the geographic area; the home to which row 318 corresponds is filtered on the basis of having an appreciation rate in the lowest 5% within the geographic area; and the home to which row 319 corresponds is filtered on the basis of having an appreciation rate in the topmost 5% for the geographic area. The boxes around the appreciation rates in rows 311, 313, 314, 316, 320, and 321 identify the homes to which these rows correspond as those remaining in the home set after the facility removes homes from the home set by discarding and filtering performed in acts 209 and 212.

Returning to FIG. 2, in act 213, the facility determines a weighting for each home that remains in the home set after the discarding and filtering. In some embodiments, the facility assigns a weighting to each home in the home set that is equal to or otherwise based on the fraction of the total value of the homes in the home set estimated at the beginning of the period by the second model that belongs to the home. In some embodiments, the facility assigns an equal weight to each home in the home set. In act 214, the facility uses each home's weighting to aggregate the appreciation values determined for the homes in the home set in act 210. For example, in some embodiments, the facility multiplies each home's appreciation rate by its weighting, then sums these products. In act 215, the facility multiplicatively chains the aggregated appreciation rate obtained in act 214 to the current index value. In act 216, the facility continues in act 202 to process the next period.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
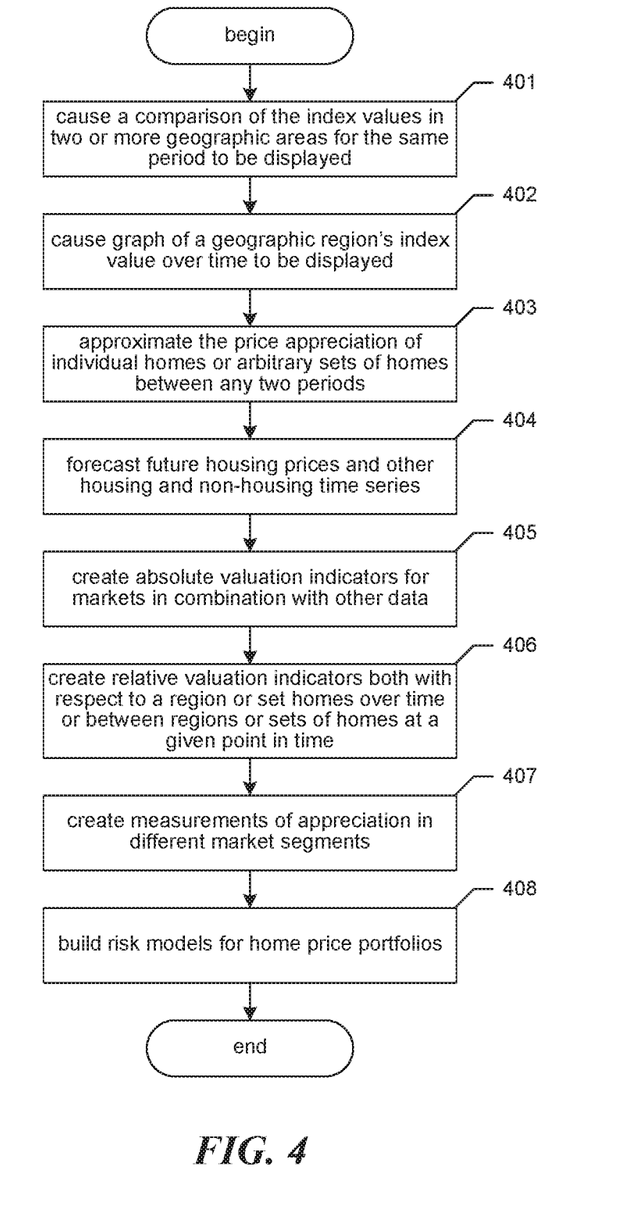
FIG. 4 is a flow diagram showing a process performed by the facility in some embodiments to act on index values produced for one or more subject regions for each of one or more time periods.

FIG. 4 is a flow diagram showing a process performed by the facility in some embodiments to act on index values produced for one or more subject regions for each of one or more time periods. In act 401, the facility causes a comparison of the index values in two or more geographic areas for the same period to be displayed. In various embodiments, this can be, for example, in a table, graph, or map.

Figure 5:
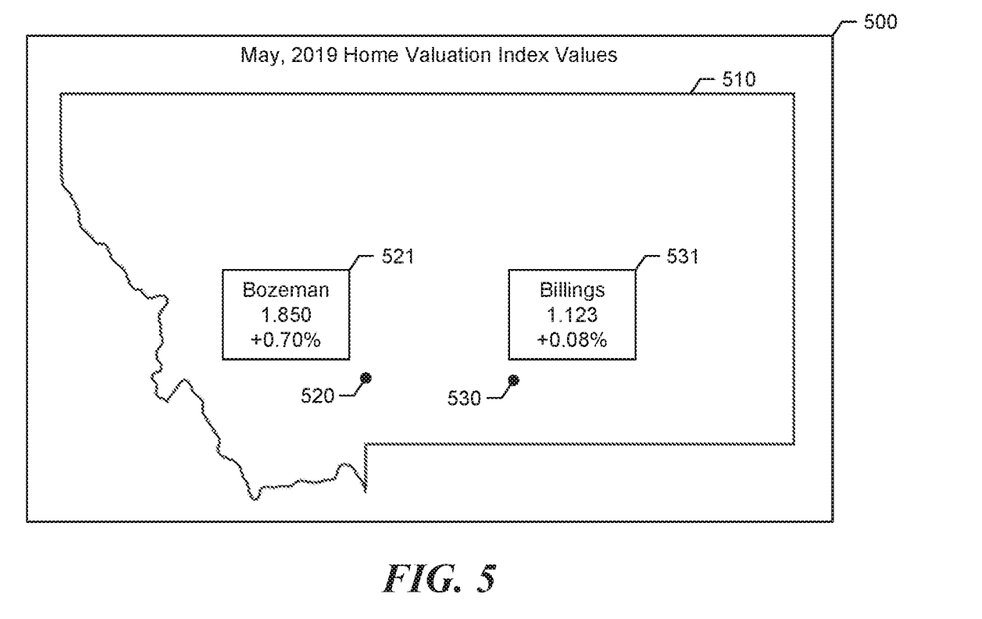
FIG. 5 is a display diagram showing sample contents of a display comparing the index values in two or more geographic areas.

FIG. 5 is a display diagram showing sample contents of a display comparing the index values in two or more geographic areas. The display 500 contains a map 510 of the State of Montana. Within the map, the location 520 of the city of Bozeman is plotted, as is the position 530 of the city of Billings. For Bozeman, near its location, a card 521 is further displayed that shows the present value of its index, as well as a recent degree of change in the index. A similar card 531 is displayed for Billings showing its index value in May, 2019, and its corresponding degree of change.

Returning to FIG. 4, in act 402, the facility causes a graph of a single geographic region's index value over time to be displayed.

Figure 6:
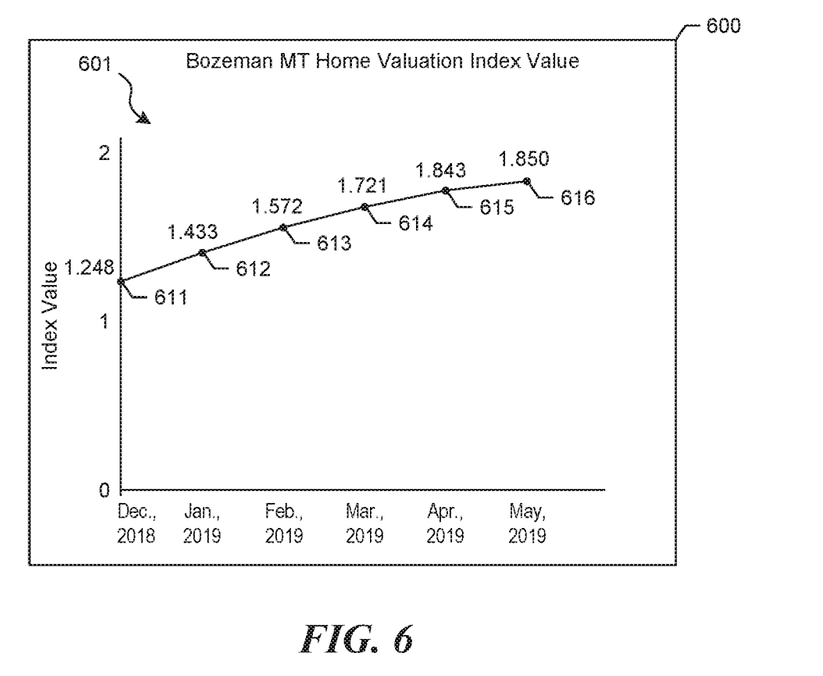
FIG. 6 is a display diagram showing sample contents of a display generated by the facility that plots the value of a single geographic region's index over time.

FIG. 6 is a display diagram showing sample contents of a display generated by the facility that plots the value of a single geographic region's index over time. The display 600 includes a graph 601 of Bozeman index value versus time. In particular, the graph shows index values 611-616 for periods between December, 2018 and May, 2019.

Returning to FIG. 4, in act 403, the facility uses a time series of the index to approximate price appreciation of individual homes or arbitrary sets of homes in the region between any two points in time. In act 404, the facility uses the index to forecast future housing prices and/or other housing or non-housing time series. In act 405, the facility uses the index together with other data, such as price-to-rent or price-to-income ratios, to create absolute valuation indicators for markets. In act 406, the facility uses the index to create relative valuation indicators, such as with respect to a region or set of homes over time, or between regions or sets of homes at a given point in time. In act 407, the facility uses the index to create measurements of appreciation in different market segments, such as in different price tiers, at different bathroom and/or bedroom counts, square footage counts, home types, building ages, etc. In act 408, the facility uses the index to build risk models for home price portfolios, such as those that systematic buyers and sellers of homes would hold. After act 408, this process concludes.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for determining a housing index value for a subject geographic region for a subject period in time, comprising:
    creating a first training set comprising one or more home sales in the subject geographic region occurring at a beginning of the subject period and corresponding home attribute values;
    training a first valuation model using the created first training set;
    creating a second training set comprising one or more homes sales in the subject geographic region occurring at an end of the subject period and corresponding home attribute values;
    training a second valuation model using the created second training set;
    for each of the homes in a set of homes comprising substantially all of the homes within the subject geographic region:
        determining a set of home attribute values for the home, each corresponding to a different home attribute among a set of home attributes;
        applying the trained first valuation model for the subject geographic region to the set of home attribute values to generate a first valuation of the home at the beginning of the subject period;
        applying the trained second valuation model for the subject geographic region to the set of home attribute values to generate a second valuation of the home at the end of the subject period;
        in response to determining that the first valuation of the home or the second valuation of the home was generated based on the set of home attribute values being different at the beginning of the subject period and at the end of the subject period: (1) updating either the created first training set or the created second training set to use the set of home attributes that are the same at both the beginning and the end of the subject period, (2) modifying the trained first valuation model or the trained second valuation model to use the updated training set, and (3) regenerating either the first valuation of the home or the second valuation of the home, respectively; and
        in response to successfully generating both the first valuation and the second valuation, determining an appreciation rate for the home on the basis of the generated first valuation of the home at the beginning of the subject period and the generated second valuation of the home at the end of the subject period, and otherwise, removing the home from the set of homes or imputing an estimated value of the home for at least one of the beginning of the subject period and the end of the subject period;
    combining the appreciation rates determined for a subset of the set of homes to obtain an aggregate appreciation rate for the subject period by determining a weighted average of the appreciation rates determined for the subset of the set of homes, wherein a weight for each home of the subset of homes is proportional to the estimated value of the home at the beginning of the subject period; and
    combining the obtained aggregate appreciation rate for the period with a housing index value for a prior period to obtain the housing index value for the subject geographic region for the subject period.

2. The method of claim 1, further comprising causing the obtained housing index value to be displayed as part of a comparison of a housing index value for the subject geographic region and at least one other geographic region.

3. The method of claim 2 wherein the displayed comparison includes a map covering the subject geographic region and the other geographic regions.

4. The method of claim 1, further comprising causing the obtained housing index value to be displayed as part of a trend over time of the housing index value for the subject geographic region.

5. The method of claim 1, further comprising:
    for each of a plurality of subject time periods, performing the method to obtain the housing index value for the subject geographic region for the subject period;
    receiving information identifying a home in the geographic region and two points in time;
    for each of the identified points in time, selecting the subject period most proximate to the point in time; and
    comparing the obtained housing index values obtained for the two selected subject periods to obtain an estimate of the appreciation of the identified home between the two identified points in time.

6. The method of claim 1, further comprising using the obtained housing index value to forecast a future housing price.

7. The method of claim 1, further comprising using the obtained housing index value to forecast future housing prices for the subject geographic region.

8. The method of claim 1, further comprising using the obtained housing index value together with a price-to-rent ratio or a price-to-income ratio to establish an absolute valuation indicator for the subject geographic region.

9. The method of claim 1 wherein the set of home attribute values determined for each home is determined for a time within the subject period.

10. The method of claim 1 wherein the set of home attribute values determined for each home is determined for the same time within the subject period.

11. The method of claim 1 wherein the trained first and second valuation models share the same model design.

12. The method of claim 1 wherein the subset of the set of homes discards homes of the set for which an estimated value of the home at the beginning of the subject period and an estimated value for the home at the end of the subject period could not both be obtained.

13. The method of claim 1, wherein the subset of homes includes a distinguished home of the set for which an estimated value at the beginning of the subject period and an estimated value at the end of the subject period could not both be obtained, and wherein imputing the estimated value of the distinguished home for at least one of the beginning of the subject period and the end of the subject period comprises applying a backup home valuation model incorporating as independent variables a proper subset of the set of home attributes.

14. The method of claim 1, wherein the subset of homes includes a distinguished home of the set for which an estimated value at the beginning of the subject period and an estimated value at the end of the subject period could not both be obtained, and wherein imputing the estimated value of the distinguished home for at least one of the beginning of the subject period and the end of the subject period comprises determining and applying a trend of estimated valuations of the home determined for a plurality of time periods proximate to the subject time period.

15. The method of claim 1 wherein the subset of homes includes a distinguished home of the set for which an estimated value at the beginning of the subject period and an estimated value at the end of the subject period could not both be obtained, and wherein imputing the estimated value of the distinguished home for at least one of the beginning of the subject period and the end of the subject period comprises:
  identifying other homes in the geographic area having home attribute values similar to those of the distinguished home;
  for each of one or both of the first and second valuation models:
    for each of the identified homes, applying the valuation model to the identified home to obtain an estimated value for the identified home; and
    aggregating the estimated values across the identified homes to obtain an estimated value for the distinguished home for the beginning or end of the subject period.

16. The method of claim 1 wherein the subset of the set of homes omits homes of the set having one or more outlier home attribute values.

17. The method of claim 1 wherein the subset of the set of homes omits homes of the set having one or more outlier valuations.

18. The method of claim 1 wherein the subset of the set of homes omits homes of the set having one or more outlier appreciation rates.

19. A computer-readable storage medium storing instructions that, when executed by a computing system, cause the computing system to perform a process for determining a housing index value for a subject geographic region for a subject period in time, the process comprising:
  creating a first training set comprising one or more home sales in the subject geographic region occurring at a beginning of the subject period and corresponding home attribute values;
  training a first valuation model using the created first training set;
  creating a second training set comprising one or more homes sales in the subject geographic region occurring at an end of the subject period and corresponding home attribute values;
  training a second valuation model using the created second training set;
  for each of the homes in a set of homes comprising substantially all of the homes within the subject geographic region:
    determining a set of home attribute values for the home, each corresponding to a different home attribute among a set of home attributes;
    applying the trained first valuation model for the subject geographic region to the set of home attribute values to generate a first valuation of the home at the beginning of the subject period;
    applying the trained second valuation model for the subject geographic region to the set of home attribute values to generate a second valuation of the home at the end of the subject period;
    in response to determining that the first valuation of the home or the second valuation of the home was generated based on the set of home attribute values being different at the beginning of the subject period and at the end of the subject period: (1) updating either the created first training set or the created second training set to use the set of home attributes that are the same at both the beginning and the end of the subject period, (2) modifying the trained first valuation model or the trained second valuation model to use the updated training set, and (3) regenerating either the first valuation of the home or the second valuation of the home, respectively; and
    in response to successfully generating both the first valuation and the second valuation, determining an appreciation rate for the home on the basis of the generated first valuation of the home at the beginning of the subject period and the generated second valuation of the home at the end of the subject period, and otherwise, removing the home from the set of homes or imputing an estimated value of the home for at least one of the beginning of the subject period and the end of the subject period;
  combining the appreciation rates determined for a subset of the set of homes to obtain an aggregate appreciation rate for the subject period by determining a weighted average of the appreciation rates determined for the subset of the set of homes, wherein a weight for each home of the subset of homes is proportional to the estimated value of the home at the beginning of the subject period; and
  combining the obtained aggregate appreciation rate for the period with a housing index value for a prior period to obtain the housing index value for the subject geographic region for the subject period.

20. A computing system for determining a housing index value for a subject geographic region for a subject period in time, comprising:
  at least one processor; and
  one or more memories storing instructions that, when executed by the one or more processors, cause the computing system to perform a process for determining a housing index value for a subject geographic region for a subject period in time, the process comprising:
    creating a first training set comprising one or more home sales in the subject geographic region occurring at a beginning of the subject period and corresponding home attribute values;
    training a first valuation model using the created first training set;
    creating a second training set comprising one or more homes sales in the subject geographic region occurring at an end of the subject period and corresponding home attribute values;
    training a second valuation model using the created second training set;
    for each of the homes in a set of homes comprising substantially all of the homes within the subject geographic region:
      determining a set of home attribute values for the home, each corresponding to a different home attribute among a set of home attributes;
      applying the trained first valuation model for the subject geographic region to the set of home attribute values to generate a first valuation of the home at the beginning of the subject period;

applying the trained second valuation model for the subject geographic region to the set of home attribute values to generate a second valuation of the home at the end of the subject period;

in response to determining that the first valuation of the home or the second valuation of the home was generated based on the set of home attribute values being different at the beginning of the subject period and at the end of the subject period: (1) updating either the created first training set or the created second training set to use the set of home attributes that are the same at both the beginning and the end of the subject period, (2) modifying the trained first valuation model or the trained second valuation model to use the updated training set, and (3) regenerating either the first valuation of the home or the second valuation of the home, respectively; and in response to successfully generating both the first valuation and the second valuation, determining an appreciation rate for the home on the basis of the generated first valuation of the home at the beginning of the subject period and the generated second valuation of the home at the end of the subject period, and otherwise, removing the home from the set of homes or imputing an estimated value of the home for at least one of the beginning of the subject period and the end of the subject period;

combining the appreciation rates determined for a subset of the set of homes to obtain an aggregate appreciation rate for the subject period by determining a weighted average of the appreciation rates determined for the subset of the set of homes, wherein a weight for each home of the subset of homes is proportional to the estimated value of the home at the beginning of the subject period; and combining the obtained aggregate appreciation rate for the period with a housing index value for a prior period to obtain the housing index value for the subject geographic region for the subject period.

21. The compute-readable storage medium of claim 19, wherein the subset of homes includes a distinguished home of the set for which an estimated value at the beginning of the subject period and an estimated value at the end of the subject period could not both be obtained; and wherein the process further comprises:
imputing an estimated value of the distinguished home for at least one of the beginning of the subject period and the end of the subject period by applying a backup home valuation model incorporating as independent variables a proper subset of the set of home attributes.

22. The computer-readable storage medium of claim 19, wherein the subset of homes includes a distinguished home of the set for which an estimated value at the beginning of the subject period and an estimated value at the end of the subject period could not both be obtained; and wherein the process further comprises:
imputing an estimated value of the distinguished home for at least one of the beginning of the subject period and the end of the subject period by determining and applying a trend of estimated valuations of the home determined for a plurality of time periods proximate to the subject time period.

23. The computing system of claim 20, wherein the subset of homes includes a distinguished home of the set for which an estimated value at the beginning of the subject period and an estimated value at the end of the subject period could not both be obtained; and wherein the process further comprises:
imputing an estimated value of the distinguished home for at least one of the beginning of the subject period and the end of the subject period by applying a backup home valuation model incorporating as independent variables a proper subset of the set of home attributes.

* * * * *